Aug. 6, 1935. R. L. ANDERSON 2,010,287
STRAW SPREADER ATTACHMENT
Filed Nov. 3, 1934 2 Sheets-Sheet 2
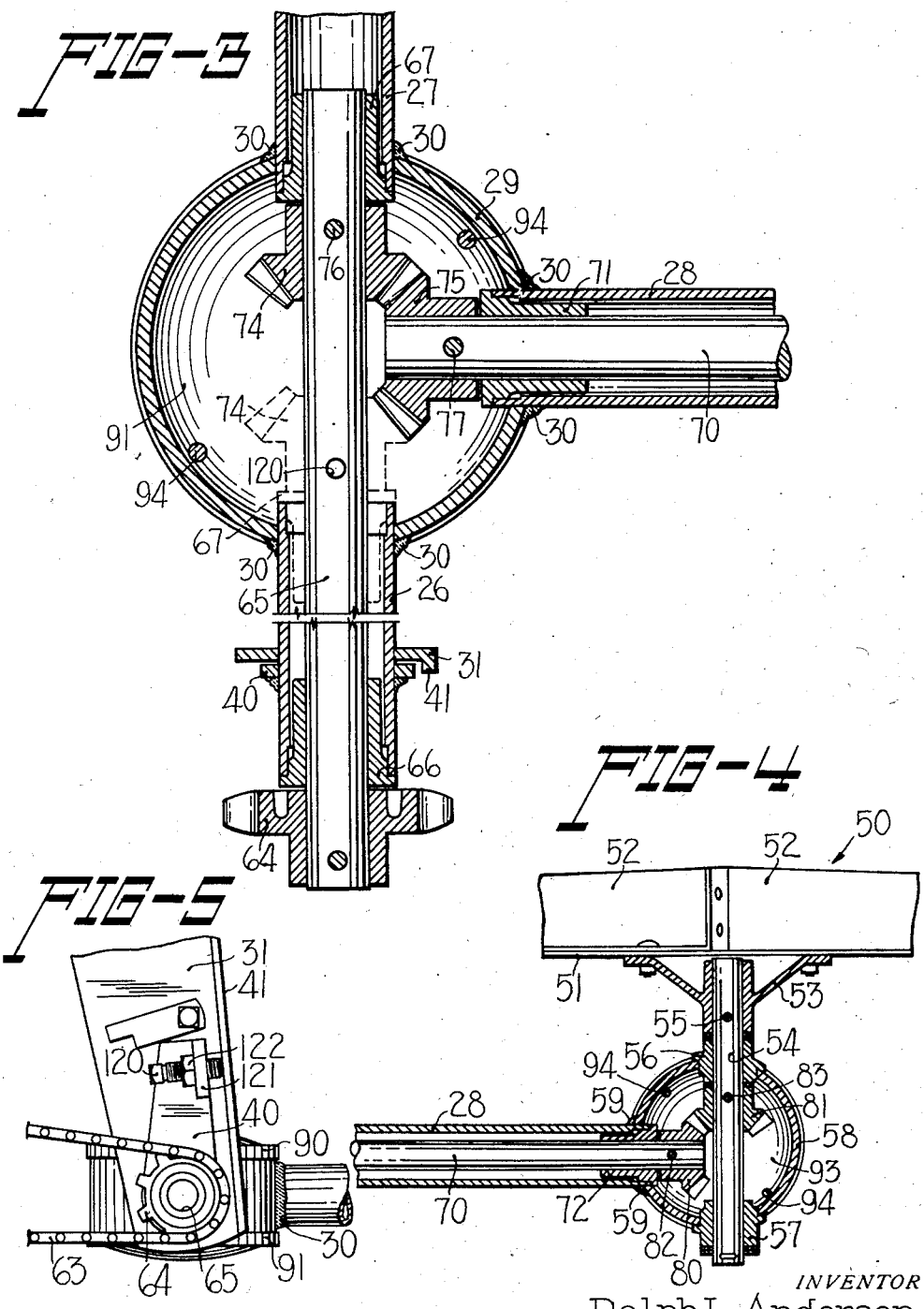
INVENTOR
Ralph L. Anderson.
BY
ATTORNEY Patented Aug. 6, 1935

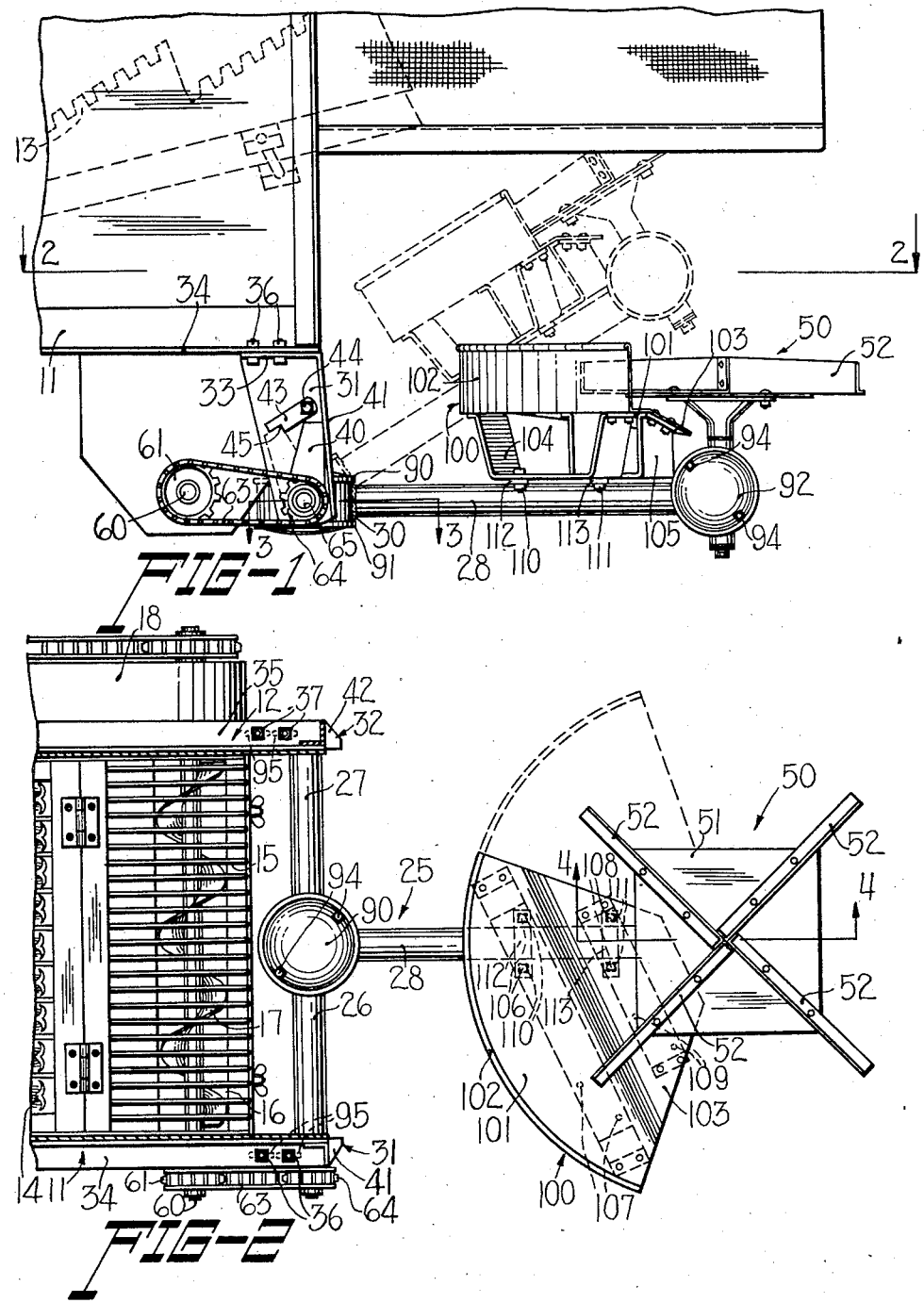

2,010,287

UNITED STATES PATENT OFFICE 2,010,287

STRAW SPREADER ATTACHMENT

Ralph L. Anderson, Moline, Ill., assignor to Deere & Company, Moline, Ill., a corporation of Illinois Application November 3, 1934, Serial No. 751,412

8 Claims. (Cl. 275—8)

This invention relates to a straw spreader attachment for harvester threshers.

The straw spreader attachments of the prior art with which I am familiar, and as are now being commonly used on commercial harvester threshers, are relatively complicated, usually employ a chain or belt for driving the spreading device disposed at one side of the attachment and usually comprise a frame, portions of which extend laterally on each side of the attachment, which form obstructions upon which the straw being deposited on the spreading device may be caught and collect and eventually interfere with the proper operation of the attachment. The main object of the invention is to provide a straw spreader attachment for harvester threshers which has a minimum number of parts and which includes a drive to the spreading device fully enclosed, and in which the spreading device is supported from the harvester thresher by means of a single centrally disposed rearwardly extending member in which the drive is enclosed, thereby reducing the obstructions upon which straw may collect to a minimum.

When working under favorable field conditions, it is desirable to have the straw spreading device operate to throw the straw being deposited upon it toward the grainward side of the thresher and away from that side of the machine along which trucks or other vehicles may be driven to receive the threshed grain from the thresher. However, when operating in a field in which the soil is damp as it may be necessary to do when harvesting certain kinds of grain such as beans, throwing straw to the grainward side of the thresher is not desirable because when the tractor and the harvester thresher are drawn over the straw so spread on the succeeding round, the cut straw acts as a binder for the damp soil and increases the tendency for the soil to collect and adhere to the tractor wheels and the supporting wheels of the harvester thresher. A special object of my invention is to provide a straw spreader attachment in which the spreading device is operated through a bevel gear drive and includes a bevel gear the position of which can be readily reversed to reverse and direction of rotation of the spreading device, whereby the straw spreader may be arranged to throw the straw to either side of the thresher.

Straw spreaders are usually provided with a deflecting shield around a portion of the spreading device to aid the spreading device in directing the straw to one side or the other of the thresher. Another object of my invention incident to the last stated object is to provide a mounting for this deflecting shield arranged so that the shield may be disposed on one side or the other of the centrally disposed support whereby it may be selectively positioned on that side of the thresher opposite the side to which the spreading device is directing straw.

It is common practice to mount a straw spreading attachment on a harvester thresher so that it is free to rock upwardly with respect to the thresher should the rear end thereof strike the ground, as it occasionally does when operating the harvester thresher in a field of uneven contour. It is usual in straw spreading attachments which are driven by chains or belts to provide an idler for the chain or belt to prevent upward movement of the spreading attachment from interfering with the proper operation of the attachment. Another object of my invention is to provide a straw spreading attachment in which the drive includes a transverse shaft and in which the frame supporting the spreader is adapted to be mounted for swinging movement relative to the thresher about an axis concentric with such transverse shaft whereby the need for any idlers in the drive to the spreading device is eliminated and the drive is in nowise affected by upward swinging movement of the straw spreader attachment relative to the thresher.

Other objects and features of my invention will be pointed out in the accompanying specification in which a preferred embodiment of my invention is described in connection with the accompanying drawings in which:

Figure 1 is a side view of the rear portion of the thresher element of a harvester thresher with my improved straw spreader mounted thereon, the latter being shown in full lines in operating position and in dotted lines in the position to which it is raised when transporting the harvester thresher;

Figure 2 is a cross-sectional view along the line 2—2 of Fig. 1 through the thresher showing the straw spreader attachment in plan;

Figure 3 is an enlarged fragmentary cross-sectional view along the line 3—3 of Figure 1;

Figure 4 is an enlarged fragmentary cross-sectional view along the line 4—4 of Figure 2; and, Figure 5 is an enlarged fragmentary view of a modified form of the straw spreader wherein means have been provided for vertically adjusting the operating position of the spreader.

The thresher in connection with which I have chosen to describe my invention comprises two longitudinally disposed transversely spaced angle iron frame members 11 and 12 which form the main supporting members for the body of the thresher. In the operation of the thresher, straw is carried rearwardly by a series of straw walkers, one of which is indicated at 13 in dotted lines in Fig. 1. The threshed grain sifts through the grain shoe 14 and unthreshed heads and tailings are conveyed rearwardly to the tailings finger bar 15 hinged to the rear end of the grain shoe 14. Falling through the tailings finger bar 15 into the trough 16, they are conveyed by the screw conveyor 17 to the tailings elevator 18. Straw conveyed rearwardly by the straw walkers 13 is deposited upon the straw spreader 20 which distributes it laterally to one side or the other of the thresher. The construction of the straw spreader 20 forms the subject matter of this invention and will now be described.

The straw spreader includes a frame 25 which comprises three pipe sections 26, 27 and 28, sections 26 and 27 being disposed in alignment and comprising a transversely disposed pipe member, and section 28 being disposed perpendicular and to the axis of pipe sections 26 and 27 and comprising a longitudinally disposed rearwardly extending pipe member. At their inner ends, pipe sections 26, 27 and 28 project into perforations formed in a cylindrical band or ring 29, the sections being welded to the band as indicated at 30. At their outer ends pipe sections 26 and 27 are journaled in perforations in the lower end of brackets 31 and 32. Brackets 31 and 32 are provided with horizontally disposed flanges 33 at their upper ends through which the brackets are connected to the horizontal flanges 34 and 35 of the frame members 11 and 12, respectively, by means of bolts 36 and 37.

To normally hold the straw spreader attachment in a horizontal operating position, an arm 40 is fixed to the outer end of each pipe section 26 and 27 adjacent the brackets 31 and 32. These arms engage outwardly extending flanges 41 and 42 provided along the rear edge of brackets 31 and 32. To hold the spreading attachment in the raised position shown in dotted lines in Fig. 1, as when transporting, an arm 43 is pivoted to the outer face of each bracket 31 and 32 by means of a bolt 44. Each arm 43 is provided with a notch 45 at its rear end which is adapted to engage the rearward corner of arm 40 when the straw spreader attachment is tilted to the position shown in dotted lines and hold the straw spreader attachment in such position. To lower the straw spreader attachment into operating position, it is merely necessary to raise pivoted arms 43 to disengage them from arms 40 and then lower the straw spreader attachment until arms 40 engage the flanges 41 and 42 on brackets 31 and 32.

The straw spreader is provided with a rotating spreading device 50 which comprises a central plate member 51 to the upper side of which four arms 52 are riveted, the arms extending laterally therefrom in the four directions. The central member 51 is provided with a hub 53 which is fixed to a vertically disposed spindle 54 by means of a pin 55. Spindle 54 is journaled in bearings 56 and 57 which are mounted in perforations in a cylindrical band or ring 58. Band 58 is supported upon the rear end of pipe section 28, the latter projecting through a perforation in band 58 and being welded thereto as indicated at 59.

Power for rotating the spreading device 50 is derived from the outer end of shaft 60 of the screw conveyor 17. This shaft extends laterally beyond frame member 11 and has a sprocket 61 fixed thereto. This sprocket is connected by means of a chain 63 to a sprocket 64 fixed on the outer end of a shaft 65 disposed within the pipe section 26 and extending into the inner end of pipe section 27. The outer end of shaft 65 is journaled in a bearing 66 disposed in the outer end of pipe section 26. The inner end of shaft 65 is journaled in a bearing 67 disposed in the inner end of pipe section 27. Another shaft 70 is disposed within pipe section 28, being journaled in bearings 71 and 72 positioned in the opposite ends of pipe section 28. Shaft 70 is driven from shaft 65 by means of a pair of bevel gears 74 and 75 located within the band 29. Bevel gear 74 is fixed to the inner end of shaft 65 by means of a pin 76. Bevel gear 75 is fixed to the forward end of shaft 70 by means of a pin 77. The vertical spindle 54 is rotated by shaft 70 by means of a pair of bevel gears 80 and 81 disposed within the band 58, bevel gear 80 being fixed by means of a pin 82 to the rear end of shaft 70 and bevel gear 81 being fixed to spindle 54 by means of a pin 83.

The two bands 29 and 58 have circular plates 90 and 91, and 92 and 93 removably fixed to opposite sides of the bands, respectively, by elongated bolts 94 to enclose the bevel gears housed within the bands.

Brackets 31 and 32 are adjustable longitudinally with respect to the frame members 11 and 12 by providing longitudinally disposed slots 95 for the bolts 36 and 37 in flanges 33 of the brackets to provide means for adjusting the tension of chain 63.

To prevent the spreading device 50 from throwing straw back into the thresher and also to aid it in directing the straw laterally, a deflecting shield 100 is disposed between the supporting pipe section 28 and the spreading device 50. This shield comprises a circular disk sector 101 the outer periphery of which has an upstanding wall 102 fixed thereto. The rear portion 102 of sector 101 inclines downwardly and rearwardly as best shown in Fig. 1. The deflecting shield is supported upon the pipe section 28 by means of a pair of U-shaped brackets 104 and 105, the upper ends of the arms of which are bolted to the under side of the sector 101. The base portion of each bracket is provided with two sets of holes 106 and 107, and 108 and 109, respectively, for receiving bolts 110 and 111 by which the shield may be fixed to brackets 112 and 113 fixed to the pipe section 28 as by welding. The two sets of holes permit the shield to be supported either in the position shown in full lines in Fig. 2 or in the position shown in dotted lines in Fig. 2, the full line position being the proper position for the shield when the spreading device is rotated in a clockwise direction looking at Fig. 2, and the dotted line position being the proper position when the spreading device is rotated in a counter-clockwise direction looking at this same figure.

Band 29 has been made large enough to permit bevel gear 74 to be shifted to the position shown in dotted lines in Fig. 3. Shaft 65 has been provided with an additional hole 120 for receiving the pin 76 to lock the bevel gear 74 in the latter position. The inner end of pipe section 26 is also adapted to receive bearing 67, in which position the bearing 67 is shifted when bevel gear 74 is shifted to the position shown in dotted lines. With bevel gear 74 in the position shown in dotted lines, shaft 70 will be rotated in the opposite direction from that when bevel gear 74 is disposed in the full line position.

To meet different field conditions, it may be desirable to position the straw spreading device at different vertical positions with respect to the thresher to which it is attached. In the form of the invention shown in Fig. 5, I have provided for adjusting the operating position by the provision of adjustable stops on the arms 40 for engaging flanges 41 and 42 on brackets 31 and 32. Each stop comprises a cap screw 120 disposed in a threaded boring in a lug 121 fixed to and extending laterally from each arm 40. Cap screws 120 are disposed to engage flanges 41 and 42. Turning cap screws 120 in one or the other direction will raise or lower the straw spreader. A lock nut 122 is provided on each cap screw 120 to lock the cap screw in any adjusted position.

In my new straw spreader attachment, inasmuch as the straw spreading device 50 and the deflecting shield 100 are both supported upon the single centrally disposed rearwardly extending frame member 28 in which the drive for the spreading device is housed, there are no obstructions on either side of the spreading device, movable or fixed, upon which straw may collect and interfere with the operation of the spreading device. By positioning the transversely disposed drive shaft 65 within the pipe section 26, and by disposing the pipe sections 26 and 27 in transverse alignment and pivotally supporting the straw spreader attachment by journaling the ends of these pipe sections in supporting brackets, the transverse drive shaft 65 is disposed coincident with the axis about which the straw spreader attachment may swing. As a result of this, such swinging movement of the straw spreader attachment does not in any way affect the drive to the spreading device and the need for an idler in the chain drive between sprockets 61 and 65 is eliminated.

What I claim is:

1. The combination with a thresher having a frame comprising side members at the rear of the thresher having longitudinally extending surfaces, a driven sprocket disposed in a longitudinal vertical plane at one side of the thresher, and having means for discharging straw at the rear of the thresher, of a straw spreader comprising a transversely disposed pipe member, a bracket on each end of said pipe member, a shaft journaled in said pipe member and projecting beyond one end thereof, a second sprocket fixed to the outer end of said shaft, a chain trained over said sprockets, said brackets being adjustably connected to said side members against said surfaces for fore and aft adjustment whereby the tension of said chain may be adjusted, a longitudinally disposed pipe member fixed to the mid portion of said first pipe member and extending rearwardly thereof, a second shaft journaled in said second pipe member and operatively connected with said first shaft, a vertically disposed spindle rotatably supported on the rear end of said second pipe member and operatively connected with said second shaft, and a straw spreading device fixed to the upper end of said spindle.

2. A straw spreader comprising a pair of brackets adapted to be fixed to opposite sides of a thresher and provided with laterally extending flanges in the same transverse plane, a pipe member journaled in the parallel flanges of the brackets, a straw spreading device supported by said pipe member, means for rotating said device including a shaft journaled in said pipe member and projecting beyond one end of said pipe member, means on the outer end of said shaft for rotating it, arms on the ends of said pipe member adapted to engage the laterally extending flanges of said brackets to hold said spreading device in an operating position, and means on said brackets adapted to engage said arms when said pipe member is swung upwardly to raise said device to an inoperative position and hold said device in such inoperative position.

3. A straw spreader comprising a pair of brackets adapted to be secured to opposite sides of a thresher, a transverse pipe member disposed between said brackets, a longitudinal pipe member fixed to the mid portion of said first pipe member, a vertically disposed spindle rotatable supported on the rear end of said second pipe member, a straw spreading device fixed to the upper end of said spindle and spaced above said second pipe member, a deflector disposed between said device and said second pipe member and carried by said second pipe member, and means for rotating said spreading device including a shaft journaled in said first pipe member, a second shaft journaled in said second pipe member and operatively connected at opposite ends to said first shaft and said spindle, respectively.

4. A straw spreader comprising a T-shaped frame, said frame comprising a circular band having two holes in the wall thereof spaced ninety degrees apart, two pipe sections fixed to said band, one over each of said holes, shafts journaled in said pipe sections, meshing bevel gears on the adjacent ends of said shafts and housed within said circular band, a member fixed at its inner end to said band at a point diametrically opposite one of said pipe sections, a pair of brackets in which the outer ends of said one pipe section and said member are respectively journaled, said brackets being adapted to be connected to the sides of a thresher and support said frame for vertical swinging, cooperative means on said one pipe section and the adjacent bracket for normally holding said frame in a horizontal position, a second circular band fixed to the outer end of the other pipe section and disposed in a longitudinal vertical plane, said second band having three holes in the wall thereof spaced ninety degrees apart, the center hole registering with the outer end of said other pipe section, bearings disposed in the other two holes, a vertical spindle journaled in said bearings, meshing bevel gears on the outer end of said second shaft and on said spindle, respectively, and housed within said second band, a straw spreading device on the upper end of said spindle, removable plates disposed on both sides of said bands to enclose the bevel gears housed therein, and means on the outer end of said first shaft for rotating it to operate said spreading device.

5. A straw spreader comprising a T-shaped frame, said frame comprising a circular band having three holes in the wall thereof spaced ninety degrees apart, three pipe sections fixed to said band, one over each of said holes, bearings in the ends of the center pipe section, a shaft journaled in said bearings, a third bearing disposed in the outer end of a second one of said pipe sections, a fourth bearing removably disposed in the inner end of the third pipe section, a second shaft journaled in said third and said fourth bearings, means for rotating said second shaft, a spreading device supported on the outer end of the center pipe section comprising a rotatable bladed member disposed to rotate in a horizontal plane and operatively connected with the outer end of said first shaft to be operated thereby, a bevel gear fixed on the inner end of said first shaft, a second bevel gear on the inner end of said second shaft, said second shaft being adapted to receive said second bevel gear in either of two positions to mesh with said first gear on either side thereof whereby said first shaft may be rotated in either direction, the inner end of said second pipe being adapted to receive said fourth bearing whereby said fourth bearing may be shifted to the latter position when said second bevel gear is disposed to mesh with said first bevel gear on the side adjacent the inner end of said second pipe section.

6. A straw spreader comprising a T-shaped frame, said frame comprising a circular band having three holes in the wall thereof spaced ninety degrees apart, three pipe sections fixed to said band, one over each of said holes, bearings in the ends of the center pipe section, a shaft journaled in said bearings, a third bearing disposed in the outer end of a second one of said pipe sections, a fourth bearing removably disposed in the inner end of the third pipe section, a second shaft journaled in said third and said fourth bearings, means for rotating said second shaft, a spreading device supported on the outer end of the center pipe section comprising a rotatable bladed member disposed to rotate in a horizontal plane and operatively connected with the outer end of said first shaft to be operated thereby, a bevel gear fixed on the inner end of said first shaft, a second bevel gear on the inner end of said second shaft, said second shaft being adapted to receive said second bevel gear in either of two positions to mesh with said first gear on either side thereof whereby said first shaft may be rotated in either direction, the inner end of said second pipe being adapted to receive said fourth bearing whereby said fourth bearing may be shifted to the latter position when said second bevel gear is disposed to mesh with said first bevel gear on the side adjacent the inner end of said second pipe section, a deflector comprising a circular disk sector disposed below said bladed member and an upstanding wall at the outer periphery thereof, and bracket means for supporting said deflector upon said center pipe, said bracket means being adapted to support said deflector on either the right or the left side of said center pipe.

7. A straw spreader comprising a pair of brackets adapted to be fixed to opposite sides of a thresher and provided with laterally extending flanges in the same transverse plane, a pipe member journaled in the parallel flanges of the brackets, a straw spreading device supported by said pipe member, means for rotating said device including a shaft journaled in said pipe member and projecting beyond one end of said pipe member, means on the outer end of said shaft for rotating it, arms on the ends of said pipe member, adjustable stops on the ends of said arms disposed to engage the laterally extending flanges of said brackets to hold said spreading device in any of a number of different operating positions.

8. A straw spreader comprising a pair of brackets adapted to be fixed to opposite sides of a thresher and provided with laterally extending flanges in the same transverse plane, a pipe member journaled in the parallel flanges of the brackets, a straw spreading device supported by said pipe member, means for rotating said device including a shaft journaled in said pipe member and projecting beyond one end of said pipe member, means on the outer end of said shaft for rotating it, arms on the ends of said pipe member, adjustable stops on the ends of said arms disposed to engage the laterally extending flanges of said brackets to hold said spreading device in any of a number of different operating positions, and means on said brackets adapted to engage said arms when said pipe member is swung upwardly to raise said device to an inoperative position and hold said device in such inoperative position.

RALPH L. ANDERSON.